United States Patent
Mola et al.

(10) Patent No.: US 8,590,347 B2
(45) Date of Patent: Nov. 26, 2013

(54) BEARING ASSEMBLY FOR WASHING MACHINE TUBS

(75) Inventors: Roberto Mola, Turin (IT); Gianpiero Scaltriti, Turin (IT); Alessandro Sansone, Pinerolo (IT)

(73) Assignee: Aktiebolaget SKF, Göteborg (SE)

( * ) Notice: Subject to any disclaimer, the term of this patent is extended or adjusted under 35 U.S.C. 154(b) by 245 days.

(21) Appl. No.: 13/070,831

(22) Filed: Mar. 24, 2011

(65) Prior Publication Data

US 2011/0232337 A1 Sep. 29, 2011

(30) Foreign Application Priority Data

Mar. 25, 2010 (IT) .............................. TO2010A0230

(51) Int. Cl.
*D06F 23/00* (2006.01)

(52) U.S. Cl.
USPC ........................................................... 68/140

(58) Field of Classification Search
USPC .................... 68/140; 384/448–449, 551–553
See application file for complete search history.

(56) References Cited

U.S. PATENT DOCUMENTS

| | | | | |
|---|---|---|---|---|
| 3,918,277 A | * | 11/1975 | Nakk | 68/140 |
| 5,675,456 A | * | 10/1997 | Myers | 360/265.6 |
| 7,059,775 B2 | * | 6/2006 | Landrieve | 384/448 |
| 7,131,648 B2 | * | 11/2006 | Peterson et al. | 277/553 |
| 2002/0059817 A1 | * | 5/2002 | Heyder et al. | 68/140 |
| 2006/0071567 A1 | * | 4/2006 | Acosta | 310/154.08 |
| 2010/0000268 A1 | * | 1/2010 | Kohne | 68/235 R |

FOREIGN PATENT DOCUMENTS

| | | |
|---|---|---|
| DE | 10350794 A1 | 6/2005 |
| EP | 1950334 A1 * | 7/2008 |
| WO | WO2010010114 A2 | 1/2010 |

* cited by examiner

*Primary Examiner* — Michael Kornakov
*Assistant Examiner* — Marc Lorenzi
(74) *Attorney, Agent, or Firm* — Bryan Peckjian; SKF USA Inc. Patent Department

(57) ABSTRACT

A bearing assembly is for a washing machine, the washing machine including a tub and a drum rotatable about a central axis. The bearing assembly comprises two bearings spaced axially apart along the central axis, a spacer disposed generally between the two bearings, and a polymeric housing. The housing includes a box-type frame molded to the bearings and to the spacer and configured to provide stiffness to the bearing assembly.

7 Claims, 1 Drawing Sheet

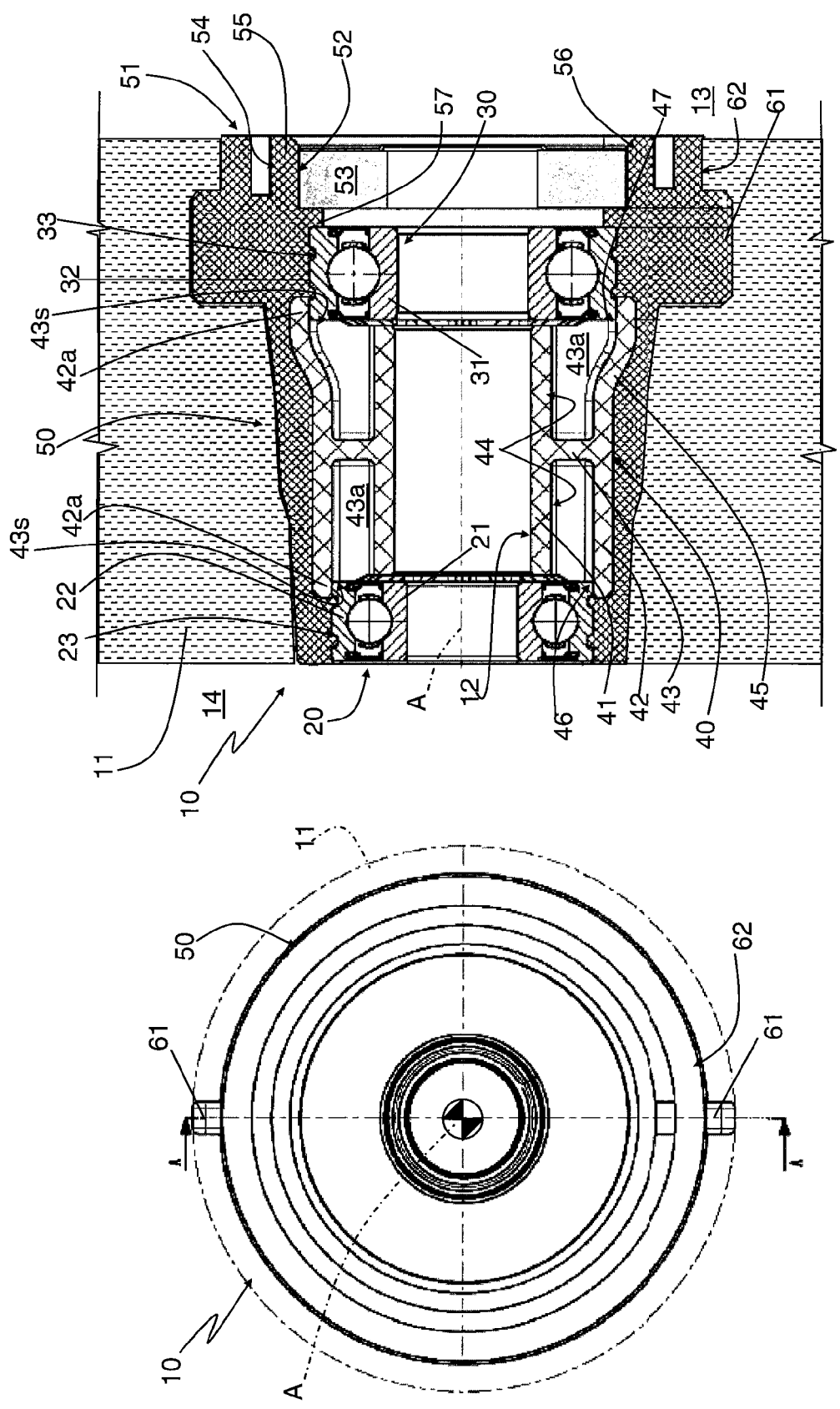

BEARING ASSEMBLY FOR WASHING MACHINE TUBS

CROSS-REFERENCE

This application claims priority to Italian Patent Application No. TO2010A000230 filed on Mar. 25, 2010, the contents of which are incorporated fully herein by reference.

BACKGROUND OF THE INVENTION

The present invention relates to bearing assemblies, and more particularly to bearing assemblies for washing machine drums.

Bearing assemblies for rotatably supporting washing machine drums are known. In certain applications, the bearing assembly can be "co-molded" with, i.e., molded onto or together with, the washing machine tub so as to become an integral part of the tub itself, which facilitates the washing machine assembly operations. Such a bearing assembly typically includes two roller bearings arranged along an axis of rotation of a washing machine drum, a spacer interposed between the two bearings, and a cylindrical housing sleeve. The sleeve is often made of a plastic material and is co-molded around the two bearings and the spacer.

With bearing assemblies of the type described above, the spacer is typically formed of a metallic material, which sometimes causes technical problems due to the environment in which the bearing assembly operates. Specifically, although the spacer is housed within an environment protected from direct contact with the washing machine liquids, water vapour and condensate are typically formed on the sleeve during most washing cycles, which gives rise to the possible formation of ferrous oxides (i.e., rust) on the inner surface of the spacer.

SUMMARY OF THE INVENTION

The object of this invention is to provide a bearing assembly for a washing machine drum.

In one aspect, the present invention is a bearing assembly for a washing machine, the washing machine including a tub and a drum rotatable about a central axis. The bearing assembly comprises two bearings spaced axially apart along the central axis, a spacer disposed generally between the two bearings, and a polymeric housing. The housing includes a box-type frame molded to the bearings and to the spacer and configured to provide stiffness to the bearing assembly.

BRIEF SUMMARY OF THE SEVERAL VIEWS OF THE DRAWINGS

The invention will now be described with reference to the attached drawings which illustrate a non-limiting exemplary embodiment, in which:

FIG. 1 is a front elevational view of a preferred embodiment of the bearing assembly of this invention; and FIG. 2 is a cross-section of the bearing assembly of FIG. 1 along the line A-A.

DETAILED DESCRIPTION OF THE INVENTION

With reference to the attached drawing figures, a bearing assembly 10 in accordance with the present invention is co-moldable (i.e., moldable to or together with) with a washing machine tub, or with any other fixed structural element, and is configured or adapted to support a washing machine drum, or any other part that rotates with a structural element.

For simplicity, the description that follows will make express reference to the case in which the bearing assembly 10 is co-molded with a tub, schematically designated 11 in the drawings, of a washing machine in order to constitute a single component with the tub 11 in such a way as to reduce the washing machine production time.

The bearing assembly 10 basically comprises two rolling bearings 20 and 30 spaced axially along an axis A of rotation of a drum (known and not shown) of the washing machine, a polymeric or plastic spacer 40 disposed generally between the two bearings 20 and 30, and a housing sleeve 50. In order to optimize production costs and times, the housing sleeve 50 is preferably formed of a polymeric or plastic material molded (or co-molded or over-molded) around the two bearings 20 and 30 and the spacer 40.

When it has been co-molded with the tub 11, the bearing assembly 10 defines a sort of pipe 12 communicating between a wet side 13 inside the tub 11 and a dry side 14 outside the tub 11, and is capable of being engaged internally by a support shaft (known and not illustrated) which supports the abovementioned drum and is arranged inside the pipe 12 so as to protrude at least partly from the dry side 14.

In order to further reduce both the washing machine production costs and times, and also to increase the reliability of the watertight seal of the tub 11, the housing sleeve 50 comprises an annular rim 51, which faces the wet side 13, and projects axially from the sleeve 50 proximal to the bearing 30. The rim 51 is generally coaxial with the axis A of rotation and is configured to define a seat 52 for a sealing element, schematically indicated in FIG. 2 at 53. The direct manufacturing of the seat 52 during the co-molding of the sleeve 50 with the bearings 20 and 30, instead of during co-molding of the tub 11 with the bearing assembly 10, not only makes the production of the tub 11 simpler, but also allows to control the geometry of the seat 52 with greater accuracy and increase the reliability of the sealing element 53. Furthermore, due to the precision of the shape with which the seat 52 is made as described herein, this could also be advantageously used for housing an encoder or any other precision measurement instruments.

Further, during the process of molding the tub 11 with the bearing assembly 10, both the injection pressure and temperature can attain values that are particularly high and critical for the materials involved. In view of this and the importance of maintaining the geometrical characteristics of the seat 52 identical to those obtained during co-molding of the bearing assembly 10, the housing rim 51 has a generally annular frontal groove 54 extending axially inwardly from a front surface of the rim 51, which is open axially toward the wet side 13 of the bearing assembly 10. The groove 54 is configured for engagement by a cylindrical stiffening body, the body having a form that is complementary to the form of the groove 54 itself, during molding of the bearing assembly 10 to the tub 11.

More specifically, the annular groove 54 extends axially inside the rim 51 with an axial depth that is lesser than an axial dimension of the rim 51. Further, the groove 54 defines a cylindrical bracket 55 having radial thickness which is lesser than an overall radial thickness of the rim 51. The bracket 55 is radially delimited or bounded radially inwardly by the seat 52. During co-molding of the tub 11 with the bearing assembly 10, the abovementioned cylindrical stiffening body (not shown) is inserted into the groove 54 in order to prevent any deformation of the bracket 55 while protecting the seat 52 from any possible deformation at the same time.

The seat 52, which is preferably generally cylindrical, is delimited axially on the wet side 13 by an inlet bevel 56 adapted to facilitate the insertion of the sealing element 53 inside the seat 52, and is axially delimited on the side of the bearing 30 by a shoulder 57 which is interposed between the bearing 30 and the seat 52, and also defines an axial shouldering element for fitting the sealing element 53.

The spacer 40 is formed of a polymeric or a plastic material, preferably but not necessarily of polypropylene reinforced with glass fiber, and if both the sleeve 50 and the spacer 40 are made of the same plastic material, the co-molding process of the former on the latter can also give rise to an intrinsic union between a surface portion of the spacer 40 and the sleeve 50, making the entire structure of the bearing assembly 10 even stiffer. According to further embodiments not shown herein, but clearly deducible from this disclosure by one skilled in the relevant art, the spacer 40 can also be made of polybutylenterephthalate reinforced with glass fibers or, in any case, with similar plastic or polymeric materials and capable of being injected in a semi-liquid state into a mold in order to give the spacer 40 a structure described herein after.

The spacer 40 has a box-type structure and comprises an internal cylindrical body 41, a shaped external body 42 coaxial with the body 41, and an intermediate radial partition wall 43 which is arranged transversally to the axis A and extends radially from the body 41 to the body 42 in a substantially intermediate position along the spacer 40 in order to render the body 41 integral with the body 42. The bodies 41 and 42 with the partition wall 43 define two annular spaces 44, so that the overall weight of the spacer 40 is lower than the weight of a solid spacer with the same stiffness characteristics.

The spacer 40 also comprises two axial ribs 43a which are arranged inside the spaces 44 parallel to the axis A and on opposite sides of the A axis, and are made in one piece and with the same material as the partition wall 43 and with the bodies 41 and 42. In the example illustrated in FIG. 2, there are two ribs 43a which subdivide each space 44 into two sectors but, in order to increase the stiffness of the spacer 40, the latter can also be made with several ribs 43a uniformly distributed around the A axis.

On the side axially facing the outside of the bearing assembly 10, the ribs 43a have respective shaped frontal surfaces 43s which are arranged axially recessed compared to the respective tubular end portions 42a of the body 42, while they are arranged axially flush vis-à-vis the body 41.

The spacer 40 has two housing seats 46 and 47 which respectively house the bearing 20 and the bearing 30 in such a way that the outer rings 22 and 32 are axially blocked to one another and are also radially blocked in the seats 46 and 47.

Each seat 46 and 47 is radially delimited by an associated tubular portion 42a which radially envelops the associated outer rings 22 and 32 from the outside, and is axially delimited towards the inside of the bearing assembly 10 by the surfaces 43s which are in axial contact with the outer rings 22 and 32 and are axially separated by the inner rings 21 and 31. In this way, each tubular portion 42a of the body 42 is arranged radially around and in contact with a portion of the outer rings 22 and 32 and the associated surfaces 43s act as an axial reference for the rings 22 and 32 with the univocal definition of an axial distance between the bearings 20 and 30, while allowing the bearings 20 and 30 to be blocked in position when they are arranged in the mold for co-molding the sleeve 50.

As the radial dimensions of the bearing 30 are greater than the radial dimensions of the bearing 20, because it has to support a greater load as it is positioned closer to the aforementioned drum, the body 42, which is maintained parallel to the body 41 on the bearing 20 side, has, on the bearing 20 side, a conical portion 45 with an increasingly wider outer diameter.

Furthermore, both the outer rings 22 and 32 are provided with respective pairs of external grooves 23 and 33 which, during co-molding of the sleeve 50, are filled with the same material as the sleeve 50 in such a way as to increase the axial sealing between the sleeve 50 and the bearings 20 and 30.

Finally, the sleeve 50 comprises one or more radial antirotational teeth 61, each of which extends outside an external surface 62 of the sleeve 50 to prevent any rotation between the bearing assembly 10 and the tub 11. There could also be only one of these radial teeth 61, but in order to give the entire bearing assembly 10 a symmetrical shape it is preferable to provide two teeth 61 arranged in symmetrical positions vis-à-vis the axis A.

The box-type structure of the spacer 40 gives the spacer not only such a stiffness as to support the mechanical and vibrational stresses to which the bearing assembly 10 is subject during its use, but also such a form and stiffness as to render the spacer 40 substantially unresponsive to the thermal stresses to which it is subjected during co-molding with the sleeve 50.

It is intended that the invention not be limited to the embodiment described and illustrated here, which is to be considered as an exemplary embodiment of the bearing assembly which is, instead, open to further modifications as regards shapes and arrangements of parts, and construction and assembly details. In fact, as has been reiterated several times, the hose is not only suitable for being used in applications that are not strictly linked to washing machines and the associated tubs, but is advantageously usable in other applications in which the bearing assembly 10, for production simplicity reasons, must be co-molded with a fixed support and must support a part that rotates relative to the fixed support, while the whole always guarantees adequate stiffness characteristics at the same time as well as a sealing capacity against atmospheric agents such as humidity, water vapour and the like.

We claim:

1. A bearing assembly for a washing machine, the washing machine including a tub and a drum rotatable about a central axis, the bearing assembly comprising:
    two bearings spaced axially apart along the central axis;
    a spacer disposed at least partially between the two bearings, the spacer comprising a first body forming a first radial wall and a second body forming a second radial wall, wherein the first body is concentric with and surrounds the second body;
    wherein the spacer includes an intermediate radial partition wall integrally joining the first body and the second body as a single piece, the partition wall defining two annular spaces between the first and second bodies;
    wherein the spacer first body has two containment seats each configured to receive a separate one of the two bearings and the spacer second body is spaced axially from the two bearings;
    a polymeric housing including a frame molded to the bearings and to the spacer and configured to provide stiffness to the bearing assembly.

2. The bearing assembly as claimed in claim 1, wherein the spacer further includes two axial ribs arranged parallel to the axis which occupy the annular spaces between the first and second bodies.

3. The bearing assembly as claimed in claim 1, wherein the spacer is formed of polypropylene reinforced with glass fiber.

4. The bearing assembly as claimed in claim 1, wherein the housing has an outer surface and includes at least one radial tooth extending radially outwardly from the outer surface and engageable with the tub so as to prevent relative rotation between the bearing assembly and the tub.

5. The bearing assembly as claimed in claim 4, wherein the housing includes an annular rim projecting axially from proximal to a first one of the two bearings, the rim being coaxial with the central axis and defining a seat configured to receive a sealing element.

6. The bearing assembly as claimed in claim 5, wherein the annular rim has a front surface and an annular groove extending axially inwardly from the front surface and open toward a side of the bearing assembly, the groove being configured for engagement by stiffening means during molding of the housing to the tub.

7. The bearing assembly as claimed in claim 6, wherein the annular groove defines a cylindrical bracket having a radial thickness lesser than a radial thickness of the rim, the bracket being bounded radially inwardly by the seat.

* * * * *